US012758956B2

(12) United States Patent
Masuda et al.

(10) Patent No.: US 12,758,956 B2
(45) Date of Patent: Oct. 13, 2026

(54) SEMICONDUCTOR PARTICLES USED IN WATER DECOMPOSITION PHOTOCATALYST, PHOTOCATALYST USING THE SAME, AND METHODS OF SYNTHESIZING THEM

(71) Applicants: TOYOTA JIDOSHA KABUSHIKI KAISHA, Aichi-ken (JP); KONAN GAKUEN, Hyogo (JP); TOYODA GOSEI CO., LTD., Aichi-ken (JP)

(72) Inventors: Taizo Masuda, Yokohama (JP); Ryota Tomizawa, Mishima (JP); Kenichi Okumura, Gotemba (JP); Tatsuya Hasegawa, Kiyosu (JP); Shigeru Ikeda, Takarazuka (JP)

(73) Assignees: TOYOTA JIDOSHA KABUSHIKI KAISHA, Aichi-ken (JP); KONAN GAKUEN, Hyogo (JP); TOYODA GOSEI CO., LTD., Aichi-ken (JP)

( * ) Notice: Subject to any disclaimer, the term of this patent is extended or adjusted under 35 U.S.C. 154(b) by 445 days.

(21) Appl. No.: 18/464,267

(22) Filed: Sep. 11, 2023

(65) Prior Publication Data

US 2024/0091755 A1 Mar. 21, 2024

(30) Foreign Application Priority Data

Sep. 15, 2022 (JP) ................................ 2022-147464

(51) Int. Cl.

| | |
|---|---|
| ***B01J 35/39*** | (2024.01) |
| ***B01J 23/02*** | (2006.01) |
| ***B01J 23/652*** | (2006.01) |
| ***B01J 23/75*** | (2006.01) |
| ***B01J 37/02*** | (2006.01) |
| ***B01J 37/04*** | (2006.01) |
| ***B01J 37/08*** | (2006.01) |
| ***C01B 3/042*** | (2026.01) |
| ***C01B 13/02*** | (2006.01) |

(52) U.S. Cl.

CPC ............... *B01J 35/39* (2024.01); *B01J 23/02* (2013.01); *B01J 23/6522* (2013.01); *B01J 23/75* (2013.01); *B01J 37/0221* (2013.01); *B01J 37/04* (2013.01); *B01J 37/08* (2013.01); *C01B 3/042* (2013.01); *C01B 13/0207* (2013.01)

(58) Field of Classification Search

CPC ........ B01J 35/39; B01J 23/02; B01J 23/6522; B01J 23/75; B01J 37/0221; B01J 37/04; B01J 37/08; C01B 3/042; C01B 13/0207

USPC ................ 502/104, 302, 313, 314, 319, 525

See application file for complete search history.

(56) References Cited

U.S. PATENT DOCUMENTS

| | | | | |
|---|---|---|---|---|
| 6,319,429 B1 * | 11/2001 | Moos | ..................... | G01N 27/12 252/521.1 |
| 2013/0082009 A1 * | 4/2013 | O'Keefe | ................. | C01B 3/042 502/200 |
| 2022/0111349 A1 | 4/2022 | Masuda et al. | | |
| 2023/0096060 A1 | 3/2023 | Masuda et al. | | |

FOREIGN PATENT DOCUMENTS

| | | | | |
|---|---|---|---|---|
| CN | 103752301 A | 4/2014 | | |
| CN | 112023938 A * | 12/2020 | ............. | C01B 3/042 |
| CN | 114192163 A * | 3/2022 | ............. | C01B 3/042 |
| CN | 114308034 A * | 4/2022 | .............. | B01J 23/22 |
| CN | 114570385 A * | 6/2022 | .......... | B01J 23/8993 |
| CN | 114588916 A | 6/2022 | | |
| JP | 2013-212477 A | 10/2013 | | |
| JP | 2022-063186 A | 4/2022 | | |
| JP | 2023-051595 A | 4/2023 | | |

OTHER PUBLICATIONS

Hao Lyu et al., "An Al-doped SrTiO3 photocatalyst maintaining sunlight-driven overall water splitting activity for over 1000 h of constant illumination." Chemical Science 10, pp. 3196-3201. (Year: 2019).*

Shilpa Patial, et al., "Tunable photocatalytic activity of SrTiO3 for water splitting: Strategies and future scenario." Journal of Environmental Chemical Engineering 8, pp. 1-21. (Year: 2020).*

K. Aravinthkumar et al., "Investigation on SrTiO3 nanoparticles as a photocatalyst for enhanced photocatalytic activity and photovoltaic applications." Inorganic Chemistry Communications, vol. 140, pp. 1-14. (Year: 2022).*

Kyohei Kaiya et al., "Water splitting over transition metal-doped SrTiO3 photocatalysts with response to visible light up to 660 nm." Chemical Science, vol. 15, Issue 39, pp. 16025-16033. (Year: 2024).*

M. Ghasemifard et al., "Effect of different dopants Ba and Ag on the properties of SrTiO3 nanopowders." Results in Physics 5, pp. 309-313. (Year: 2015).*

Tanvir Hussain et al., "Preparation of Ba-doped SrTiO3 photocatalyst by sol-gel method for hydrogen generation." Chemical Physics Letters 754, pp. 1-6. (Year: 2020).*

Lei, "Study on the syntheses, modification and photocatalytic hydrogen evolution performance of titanate photocatalysts", Chinese Master's Theses Full-text Database Engineering Science and Technology I, 2015, 02, B015-103, 103pp.

(Continued)

*Primary Examiner* — Patricia L. Hailey

(74) *Attorney, Agent, or Firm* — HAUPTMAN HAM, LLP

(57) ABSTRACT

In a photocatalyst which is obtained by adding a co-catalyst to semiconductor particles containing strontium titanate and which causes a water decomposition reaction in which water molecules are decomposed into oxygen molecules and hydrogen molecules according to light emission, the semiconductor particles are doped with barium or additionally with scandium. A method of synthesizing a semiconductor for the photocatalyst includes a process of synthesizing semiconductor particles containing strontium titanate doped with barium by mixing barium titanate or additionally with scandium oxide into strontium chloride or mixing strontium titanate or additionally scandium oxide into strontium chloride and barium chloride and performing firing.

19 Claims, 3 Drawing Sheets

(56) References Cited

OTHER PUBLICATIONS

Takata, et al., "Fabrication of a Core-Shell-Type Photocatalyst via Photodeposition of Group IV and V Transition Metal Oxyhydroxides: An Effective Surface Modification Method for Overall Water Splitting", JACS, 2015, 9627-9634, 137, 8pp.
T.Takata et al., Photocatalytic water splitting with a quantum efficiency of almost unity, Nature, May 28, 2020, pp. 411-414, vol. 581, 16pp.

* cited by examiner

SEMICONDUCTOR PARTICLES USED IN WATER DECOMPOSITION PHOTOCATALYST, PHOTOCATALYST USING THE SAME, AND METHODS OF SYNTHESIZING THEM

CROSS-REFERENCE TO RELATED APPLICATION

This application claims priority to Japanese Patent Application No. 2022-147464 filed on Sep. 15, 2022, incorporated herein by reference in its entirety.

BACKGROUND

1. Technical Field

The present disclosure relates to semiconductor particles used in a photocatalyst that causes a water decomposition reaction in which water is decomposed into hydrogen and oxygen, a photocatalyst prepared using the same, and methods of synthesizing them.

2. Description of Related Art

Hydrogen gas is expected to be used as a next generation clean fuel that does not produce carbon dioxide when burned. Since hydrogen gas can be produced by a water decomposition reaction caused by light energy using a photocatalyst, the development of a photocatalyst that can efficiently cause a water decomposition reaction with light has progressed. As an example of such a highly efficient photocatalyst, in T. Takata, 8 others, Nature, volume 581, pp. 411-414, 2020, a photocatalyst with a quantum efficiency of about 1 in the water decomposition reaction and its synthesis method have been reported. In T. Takata, 8 others, Nature, volume 581, pp. 411-414, 2020, in a nutshell, it was shown that a photocatalyst obtained by adhering oxides of Rh (rhodium), Cr (chromium), Co (cobalt) and the like to the crystal planes of semiconductor ($SrTiO_3$:Al) particles made of strontium titanate ($SrTiO_3$) doped with aluminum (Al) exhibited an (external) quantum efficiency of 96% in water decomposition according to emission of light with a wavelength of 350 nm to 360 nm (the (external) quantum efficiency was provided as a value obtained by dividing the number of reduced hydrogen atoms (=the number of generated hydrogen molecules×2) by the number of emitted photons; hereinafter, in this specification, the term "quantum efficiency" indicates (external) quantum efficiency). The reason for such high quantum efficiency being obtained is considered to be that, in the structure of the photocatalyst, $Rh/Cr_2O_3$ and CoOOH are adhered to different crystal planes of $SrTiO_3$:Al particles, and thereby, transfer of charges generated with light toward the surfaces of particles is achieved without causing transfer of charges in the opposite direction. In addition, Japanese Unexamined Patent Application Publication No. 2022-63186 (JP 2022-63186 A) discloses a hydrogen production device that produces hydrogen using strontium titanate as a photocatalyst. Here, Japanese Unexamined Patent Application Publication No. 2013-

212477 (JP 2013-212477 A) discloses that strontium titanate particles supporting Fe and/or Ba are used as a catalyst that produces hydrogen by reacting a sulfur-containing fuel with water vapor rather than a photocatalyst.

SUMMARY

In the above T. Takata, 8 others, Nature, volume 581, pp. 411-414, 2020, it was reported that $SrTiO_3$:Al semiconductor particles, which achieve a quantum efficiency of 96%, were prepared by grinding and mixing $SrTiO_3$, $Al_2O_3$ and $SrCl_2$ powders in an agate mortar, and firing the mixture (raw material mixture) in which $SrCl_2$ was dissolved in an alumina crucible at 1,150° C. for 10 hours. However, according to a reproduction experiment performed by the inventors of the present disclosure and the like, actually, as described in T. Takata, 8 others, Nature, volume 581, pp. 411-414, 2020, in a water decomposition reaction using a photocatalyst prepared from particles obtained by firing the raw material mixture at 1,150° C. for 10 hours, the quantum efficiency only reached 8% to 28% (in 37 trials, an average value of 16%, and a standard deviation of 3.56%). In addition, when the (external) quantum efficiency of the photocatalyst obtained by variously changing the firing temperature and the firing time when $SrTiO_3$:Al particles from the raw material mixture were fired was examined, it was confirmed that, as shown in the following Table 1, the variation in the average value of the (external) quantum efficiency with respect to the firing temperature and the firing time was large, and the ranges of firing temperature and time conditions that provide high efficiency were narrow. For example, with reference to Table 1, it was confirmed that, if the set temperature during firing differed by only twenty and several degrees Celsius, the quantum efficiency of the photocatalyst using the obtained semiconductor particles may change significantly (when the firing time was 10 h, there was a difference of about 30% in the quantum efficiency when the firing temperature was changed from 1,150° C.→1,175° C.). This indicates that, when semiconductor particles are prepared with a composition described in the above T. Takata, 8 others, Nature, volume 581, pp. 411-414, 2020, whether a photocatalyst with high quantum efficiency is obtained is likely to be affected by the temperature at which the raw material mixture is exposed during firing. Actually, it is thought that, when $SrTiO_3$:Al particles from the mixture are fired, air in a firing furnace being circulated by a circulation fan so that the temperature distribution is uniform, but almost no convection occurs in the crucible, the temperature may be uneven, and thereby a decrease or variation in the quantum efficiency of the photocatalyst occurs. In any case, such a decrease or variation in the quantum efficiency of the photocatalyst with respect to the firing temperature and the firing time during firing of the semiconductor particles is not preferable in mass synthesis and practical applications of the photocatalyst.

TABLE 1

Quantum efficiencies when the temperature and the time were changed when semiconductor particles were fired (average value ± standard deviation)

| | | Firing temperature (° C.) | | | |
|---|---|---|---|---|---|
| | | 1,150 | 1,175 | 1,185 | 1,200 |
| Firing time (hours) | 10 | 16% ± 3.7% | 48% ± 8.6% | 46% ± 5.0% | 49% ± 3.2% |
| | 15 | 61% ± 12.2% | 50% ± 8.9% | 67% ± 10.3% | 50% ± 6.2% |
| | 30 | 41% ± 3.6% | 51% ± 6.2% | 66% ± 4.8% | 46% ± 3.2% |

Number of trials under conditions was 3 (37 trials only at 1,150° C. for 10 hours)

Therefore, when the inventors of the present disclosure and the like conducted research and development of a photocatalyst suitable for mass synthesis and practical applications, they found that, when semiconductor particles containing strontium titanate as a main component and additionally containing barium were used, it was possible to prepare a photocatalyst that stably achieves high quantum efficiency in a water decomposition reaction with light. Specifically, it was shown that, when semiconductor particles containing strontium titanate as a main component and additionally containing barium were used, if the conditions were adjusted, it was possible to obtain a photocatalyst that can stably achieve a quantum efficiency of 70% or more, and preferably 80% to 90%. In addition, it was found that, when scandium was doped with strontium titanate, a photocatalyst that provides high quantum efficiency could be obtained without aluminum doping. In the present disclosure, this finding is used.

Thus, a main object of the present disclosure is to provide a photocatalyst that achieves high quantum efficiency as stably as possible in a water decomposition reaction with light, which is a photocatalyst suitable for mass synthesis and practical applications.

In addition, another object of the present disclosure is to provide semiconductor particles that provide the photocatalyst as described above, a photocatalyst using the same, and methods of synthesizing them.

According to one aspect of the present disclosure, the above object is achieved by semiconductor particles containing strontium titanate to which a co-catalyst is added and used as a photocatalyst that causes a water decomposition reaction in which water molecules are decomposed into oxygen molecules and hydrogen molecules according to light emission, and in which strontium titanate is doped with barium.

In the above configuration, as described above, the "photocatalyst" is a substance that can cause a water decomposition reaction when radiated with light, reduce water, and generate oxygen molecules (oxygen gas) and hydrogen molecules (hydrogen gas). Similar to the photocatalyst described in the above T. Takata, 8 others, Nature, volume 581, pp. 411-414, 2020, such a "photocatalyst" is basically a substance obtained by adding a co-catalyst to semiconductor particles containing strontium titanate, and in the present disclosure, is a substance in which semiconductor particles containing strontium titanate are doped with barium. The co-catalyst added to semiconductor particles when semiconductor particles are used as a photocatalyst for a water decomposition reaction and its addition method may be the same as those in T. Takata, 8 others, Nature, volume 581, pp. 411-414, 2020 or other prior art. Here, in the semiconductor particles, moreover, it is preferable that strontium titanate be additionally doped with scandium. As described above, when semiconductor particles containing strontium titanate are doped with barium or additionally with scandium, as will be described below in the embodiment section, it is possible to more stably increase the quantum efficiency of the photocatalyst compared with when semiconductor particles that are not doped with barium or scandium are used as a photocatalyst.

It was found that, regarding components of the semiconductor particles used in the photocatalyst in the present disclosure, more specifically, with respect to 100 parts by weight of strontium titanate in the semiconductor particles, the content of barium may be 0.04 parts by weight to 5 parts by weight and the content of scandium may be 0.1 parts by weight to 1 part by weight, and in this case, a photocatalyst with a quantum efficiency of more than about 70% could be obtained. In addition, more preferably, in the semiconductor particles, it was found that the content of barium may be 0.1 parts by weight to 2 parts by weight, and in this case, a photocatalyst with a quantum efficiency of 80% to 90% can be stably obtained. Here, the proportions of the components of the semiconductor particles were detected through inductively coupled plasma mass spectrometry (ICP-MS).

In the semiconductor particles according to the present disclosure, aluminum may or may not be actively included. The content of aluminum in the semiconductor particles with respect to 100 parts by weight of strontium titanate may be 1 part by weight or less.

Synthesis of the semiconductor particles used in the photocatalyst in the present disclosure may be achieved by the following two methods.

In a first method of synthesizing semiconductor particles, the semiconductor particles according to the present disclosure may be synthesized by a method including a process of synthesizing semiconductor particles containing strontium titanate doped with barium by mixing barium titanate ($BaTiO_3$) into strontium chloride ($SrCl_2$) and performing firing. In this case, more preferably, scandium oxide ($Sc_2O_3$) is additionally mixed with strontium chloride and the mixture is fired, and thus the semiconductor particles may be doped with barium and scandium, and thereby, it is possible to more stably increase the quantum efficiency of the photocatalyst. When aluminum oxide ($Al_2O_3$) is additionally mixed in and the mixture is fired, the semiconductor particles may be additionally doped with aluminum. However, aluminum is not essential. In the embodiment, in the process of synthesizing semiconductor particles, with respect to 100 parts by mole of barium titanate, 500 parts by mole to 2,000 parts by mole of strontium chloride, 0.1 parts by mole to 5 parts by mole of scandium oxide, and 0 parts by mole to 5 parts by mole of aluminum oxide may be mixed in and fired, and thus semiconductor particles may be synthesized.

In a second method of synthesizing semiconductor particles, semiconductor particles according to the present disclosure may be synthesized by a method including a process of synthesizing semiconductor particles containing strontium titanate doped with barium and scandium by mixing strontium titanate ($SrTiO_3$) and scandium oxide ($Sc_2O_3$) into a mixture containing strontium chloride ($SrCl_2$) and barium chloride ($BaCl_2$) and performing firing. In this case, aluminum oxide ($Al_2O_3$) is additionally mixed into a mixture containing strontium chloride and barium chloride and the mixture is fired, and thus the semiconductor particles may be additionally doped with aluminum. Here, aluminum is not essential. In the embodiment, in the process of synthesizing semiconductor particles, the semiconductor particles may be synthesized by mixing a mixture containing strontium chloride and barium chloride at a molar ratio of 1:9 to 9:1 as a mixture of 1,000 parts by mole of strontium chloride and barium chloride with respect to 100 parts by mole of strontium titanate, 0.1 parts by mole to 5 parts by mole of scandium oxide ($Sc_2O_3$) and 0 parts by mole to 5 parts by mole of aluminum oxide and performing firing.

In the firing in the process of synthesizing semiconductor particles for the photocatalyst of the present disclosure, in the case of the first method, strontium chloride melts and becomes a liquid, and in the liquid, barium atoms or additionally scandium atoms or additionally aluminum atoms enter the interior of strontium titanate, resulting in a doped state, and particles of Ba—$SrTiO_3$, Ba—Sc—$SrTiO_3$ or Al—Ba—Sc—$SrTiO_3$ are formed. In addition, in the case of the second method, the mixture containing strontium chloride and barium chloride melts and becomes a liquid, and in the liquid, barium atoms, scandium atoms or additionally aluminum atoms enter the interior of strontium titanate, resulting in a doped state, and particles of Ba—Sc—$SrTiO_3$ or Al—Ba—Sc—$SrTiO_3$ are formed. Therefore, in the firing process, firing temperature and time conditions may be appropriately set so that the semiconductor particles as described above are formed. Specifically, as conditions during firing in such synthesis, according to experiments, the firing temperature may be 1,000° C. to 1,200° C., and the firing time may be 10 hours to 30 hours, but the present disclosure is not limited thereto.

When photocatalytic properties are imparted to the semiconductor particles obtained according to the teachings of the present disclosure, as previously described, the same appropriately selected co-catalyst as before may be added. Addition of such a co-catalyst can be achieved by performing a process of adding a co-catalyst to the surface of the semiconductor particles dispersed in water by an arbitrary method. The co-catalyst added to semiconductor particles may be, specifically, rhodium-chromium oxide ($Rh/Cr_2O_3$) or cobalt hydroxide oxide (CoOOH) as in T. Takata, 8 others, Nature, volume 581, pp. 411-414, 2020, and these co-catalysts can be more suitably added to the surface of the semiconductor particles dispersed in water by photoelectrodepositing (also referred to as photodepositing). In the present application, "rhodium-chromium oxide ($Rh/Cr_2O_3$)" has a form that Rh is attached on $Cr_2O_3$. In the case of photoelectrodepositing, for example, the amounts of Rh, Cr, and Co with respect to the amount of semiconductor particles may be about 0.1 wt %, 0.05 wt %, and 0.05 wt %, respectively, but the present disclosure is not limited thereto.

Thus, according to the present disclosure, as semiconductor particles used in a photocatalyst which is obtained by adding a co-catalyst to semiconductor particles containing strontium titanate and which causes a water decomposition reaction in which water molecules are decomposed into oxygen molecules and hydrogen molecules according to light emission, when those obtained by doping strontium titanate with barium or additionally with scandium are used, and a photocatalyst having a higher quantum efficiency value of the water decomposition reaction and less variation than before can be synthesized with favorable reproducibility. According to the method and semiconductor particles of the present disclosure, since the properties related to the quantum efficiency of the photocatalyst become more stable, it can be said that the method and semiconductor particles of the present disclosure are the method and semiconductor particles which are more suitable for mass synthesis and practical applications of the photocatalyst for producing hydrogen gas.

Other objects and advantages of the present disclosure will become apparent from the following description of preferable embodiments of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Methods of Synthesizing Semiconductor Particles for Water Decomposition Reaction Photocatalyst and Photocatalyst Semiconductor particles for a water decomposition reaction photocatalyst according to the present embodiment are synthesized by heating a raw material mixture in which strontium chloride ($SrCl_2$) is mixed with barium titanate ($BaTiO_3$) or additionally with scandium oxide ($Sc_2O_3$) and aluminum oxide ($Al_2O_3$) (a raw material mixture in a first synthesis method) or a raw material mixture in which a mixture containing strontium chloride ($SrCl_2$) and barium chloride ($BaCl_2$) is mixed with strontium titanate ($SrTiO_3$) or additionally with scandium oxide ($Sc_2O_3$), and aluminum oxide ($Al_2O_3$) (a raw material mixture in a second synthesis method) to a temperature at which $SrCl_2$ and $BaCl_2$ melt and become a liquid (where, a temperature at which $BaTiO_3$, $SrTiO_3$, $Sc_2O_3$, and $Al_2O_3$ do not melt), doping $SrTiO_3$ with barium atoms (Ba) or additionally with scandium atoms (Sc) or additionally with aluminum atoms (Al), and converting $SrTiO_3$ into a semiconductor (flux method). Then, the photocatalyst is synthesized by adding a co-catalyst substance to the semiconductor particles obtained by the flux method, for example, a photoelectrodepositing method (also referred to as photodepositing method).

Figure 1:
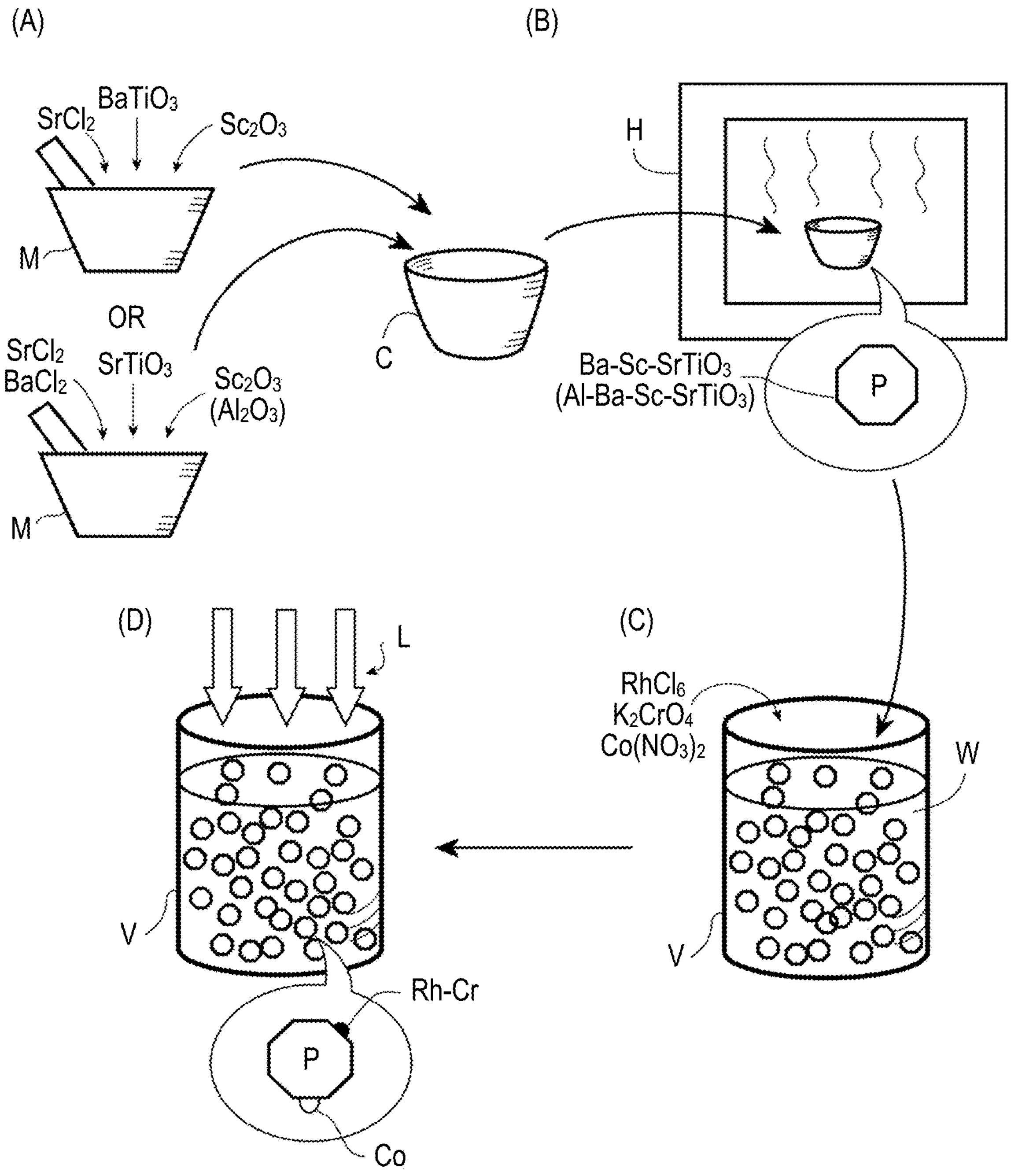
FIG. 1 is a schematic view illustrating processes of methods of synthesizing semiconductor particles according to the present disclosure and a photocatalyst using the same.

More specifically, with reference to FIG. 1, in the present embodiment, semiconductor particles are prepared by two synthesis methods with different starting materials. In the first synthesis method, a large amount of $SrCl_2$ powder is mixed with $BaTiO_3$ powder or additionally mixed with $Sc_2O_3$ powder and $Al_2O_3$ powder. Preferable proportions of respective powders are as follows.

with respect to 100 parts by mole of $BaTiO_3$, $SrCl_2$: 500 parts by mole to 2,000 parts by mole $Sc_2O_3$: 0.1 parts by mole to 5 parts by mole $Al_2O_3$: 0 parts by mole to 5 parts by mole ($Al_2O_3$ may not be contained)

In addition, in the second synthesis method, a mixture containing a large amount of $SrCl_2$ powder and $BaCl_2$ powder is mixed with $SrTiO_3$ powder or additionally with $Sc_2O_3$ powder and $Al_2O_3$ powder. Preferable proportions of respective powders are as follows.

with respect to 100 parts by mole of $SrTiO_3$, $SrCl_2$+$BaCl_2$: 1,000 parts by mole (the molar ratio of $SrCl_2$ and $BaCl_2$ is 1:9 to 9:1)

$Sc_2O_3$: 0.1 parts by mole to 5 parts by mole $Al_2O_3$: 0 parts by mole to 5 parts by mole ($Al_2O_3$ may not be contained)

Mixing of the above powders may be performed, for example, by grinding in an agate mortar (M) (about 30 minutes).

Thereafter, the raw material mixture powder is transferred to a firing crucible, for example, an alumina crucible (C), and fired in a firing furnace (H) ((B) in FIG. 1). In this process, as described above, the firing temperature may be a temperature at which $SrCl_2$ melts and becomes a liquid (874° C. or higher), a temperature at which $SrCl_2$ and $BaCl_2$ melt and become a liquid (962° C. or higher) or a temperature at which $BaTiO_3$, $SrTiO_3$, $Sc_2O_3$, and $Al_2O_3$ do not melt (1,625° C. or lower), and as described below, according to experiments performed by the inventors of the present disclosure and the like, the firing temperature may be, for example, about 1,000° C. to 1,200° C., and preferably 1,100° C. to 1,200° C. In addition, the firing time for which the raw material mixture is exposed at the above temperature is a time sufficient for $SrTiO_3$ to be doped with Ba or additionally with Sc or additionally with Al and converting $SrTiO_3$ into a semiconductor, and according to experiments performed by the inventors of the present disclosure and the like, as described below, the firing time may be 10 hours to 30 hours and preferably about 30 hours.

After the firing process, when the fired product is cooled to room temperature, water (distilled water may be used) is added to the crucible (C), the fired product in the crucible is dispersed as particles in water while stirring by applying ultrasonic waves with an ultrasonic stirrer or the like, suction filtration is additionally performed, and thus the fired product may be collected. Such a particulate fired product is semiconductor particles P (Ba—$SrTiO_3$, Ba—Sc—$SrTiO_3$ or Al—Ba—Sc—$SrTiO_3$, Al—Ba—$SrTiO_3$) for the photocatalyst according to the present embodiment. Then, the collected semiconductor particles P may be washed with water. Such washing may be performed until the pH of washing water is 7, and washing water is free of chlorine. Thus, the semiconductor particles may be dried after washing.

In order for the above semiconductor particles to function as a photocatalyst, a co-catalyst is added to the crystal planes of semiconductor particles. It is thought that, after charges (electrons and holes) generated in semiconductor particles according to light emission in the water decomposition reaction with light move to the surface of semiconductor particles, such a co-catalyst prevents these charges from returning into the semiconductor particles again. In the present embodiment, a co-catalyst may be added to semiconductor particles by an arbitrary method, and typically, as already mentioned, as in T. Takata, 8 others, Nature, volume 581, pp. 411-414, 2020, by a photoelectrodepositing method, a co-catalyst is precipitated in the crystal planes of the semiconductor particles dispersed in water, and thus the co-catalyst may be added to the semiconductor particles. Specifically, first, semiconductor particles are dispersed in water in a transparent container such as a glass container ((C) in FIG. 1). Here, ultrasonic waves may be applied to water in which semiconductor particles are dispersed (semiconductor particle dispersion solution) so that the semiconductor particles are uniformly dispersed. Thereafter, treatments of adding salts as a raw material of the co-catalyst, emitting light L is, and precipitating metal oxides as a co-catalyst on the surface of the semiconductor particles P are performed ((D) in FIG. 1).

More specifically, as a co-catalyst added to the surface of the semiconductor particles P, as in T. Takata, 8 others, Nature, volume 581, pp. 411-414, 2020, when rhodium-chromium oxide ($Rh/Cr_2O_3$) or cobalt hydroxide oxide (CoOOH) are used, the process may be performed as follows. That is, first, a rhodium chloride ($RhCl_3$) aqueous solution is added to a semiconductor particle dispersion solution so that the amount of rhodium (Rh) is 0.1 wt % with respect to the amount of the semiconductor particles, and light from a xenon lamp (300 W, 20 mA) is emitted to the semiconductor particle dispersion solution under atmospheric pressure for 10 minutes. Next, a potassium chromate ($K_2CrO_4$) aqueous solution is added to the semiconductor particle dispersion solution so that the amount of chromium (Cr) is 0.05 wt % with respect to the amount of the semiconductor particles, and light from a xenon lamp (300 W, 20 mA) is emitted under atmospheric pressure for 5 minutes. Then, a cobalt nitrate ($Co(NO_3)_2$) aqueous solution is added to the semiconductor particle dispersion solution so that the amount of cobalt (Co) is 0.05 wt % with respect to the amount of the semiconductor particles, and light from a xenon lamp (300 W, 20 mA) is emitted under atmospheric pressure for 5 minutes. Then, as schematically shown in (D) in FIG. 1, Rh—Cr oxide and Co oxyhydroxide are adhered to the surface of the semiconductor particles P, and thus the prepared compound functions as a photocatalyst that causes a water decomposition reaction with light. Here, in the process of adding a co-catalyst to the surface of the semiconductor particles by a photoelectrodepositing method, the concentration of salts for the co-catalyst added to the semiconductor particle dispersion solution may be appropriately adjusted. According to experiments performed by the inventors, for example, it is found that, when the concentration of salts for the co-catalyst is 4 times the above concentration, the quantum efficiency decreases significantly, and thus such a salt concentration is preferably adjusted so that the concentration does not become excessive. In addition, addition of a co-catalyst to the surface of the semiconductor particles may be performed by an impregnation method (adding salts to the dispersion solution and applying heat) in addition to the photoelectrodepositing method.

The performance of the semiconductor particles prepared by the synthesis method according to the present embodiment is evaluated by measuring the quantum efficiency [number of hydrogen molecules×2/number of emitted photons] in the water decomposition reaction with light when a co-catalyst is added to impart photocatalytic properties. Regarding the performance of such semiconductor particles, as will be understood from the following experiment example, in the composition (detected through ICP-MS) of the semiconductor particles, when the content of barium is 0.1 parts by weight to 2 parts by weight with respect to 100 parts by weight of strontium titanate, a quantum efficiency of about 70% or more is stably provided (when the content of scandium is 0.1 parts by weight). In addition, in the composition of the semiconductor particles, when 0.7 parts by weight to 0.8 parts by weight of barium is present with respect to 100 parts by weight of strontium titanate, if the content of scandium is 0.1 parts by weight to 1 part by weight, a quantum efficiency of more than 70% is obtained (when there is no scandium, the quantum efficiency is about 30%). Here, regarding the presence of aluminum, no significant difference in the quantum efficiency is observed under conditions in which the content of aluminum is less than 1 part by weight with respect to 100 parts by weight of strontium titanate. In addition, no significant difference in the quantum efficiency is observed between when the starting material is obtained in the first synthesis method and when the starting material is obtained in the second synthesis method. Therefore, according to the present embodiment, when semiconductor particles in which strontium titanate is doped with barium or additionally with scandium are synthesized and a photocatalyst is prepared using the same, it is possible to provide semiconductor particles and a photocatalyst that stably provide higher quantum efficiency.

Experiment Example

According to the teachings of the present embodiment, semiconductor particles in which strontium titanate was doped with barium or additionally with scandium or aluminum and a photocatalyst using the same were synthesized, the quantum efficiency of the photocatalyst was measured, and the effectiveness of the present embodiment was verified. Here, it should be understood that the following experiment example shows effectiveness of the present embodiment and does not limit the scope of the present disclosure.

Semiconductor particles were synthesized according to the above process. Specifically, first, $SrCl_2$ powder, $BaTiO_3$ powder, $Sc_2O_3$ powder and $Al_2O_3$ powder at various proportions in the first synthesis method and $SrCl_2$ powder, $BaCl_2$ powder, $SrTiO_3$ powder, $Sc_2O_3$ powder and $Al_2O_3$ powder at various proportions in the second synthesis method were ground and mixed in an agate mortar for 30 minutes. The powder mixture was transferred to an alumina crucible and then fired in a firing furnace by setting various firing temperatures and firing times. Here, in the firing process, the temperature was raised from room temperature to the firing temperature in 2 hours, and after the firing time was elapsed, the sample was cooled to room temperature over 6 hours. After cooling, distilled water was added to the crucible containing the fired product, ultrasonic waves were applied with an ultrasonic stirrer and stirring was performed, and the fired product in the crucible (the material adhered to the inner wall of the crucible was also dispersed) was dispersed in water as particles and collected by suction filtration. Then, the collected particulate fired product was washed with distilled water. In washing, the pH of the washing water was checked using pH test paper, the presence of chlorine in the washing water was checked for whether silver chloride was generated by adding 0.1 M silver nitrate to the washing water, and washing was performed until the pH of the washing water reached 7 and chlorine was no longer detected. Then, the particulate fired product after washing, that is, the semiconductor particles, were dried at 70° C. The composition of the semiconductor particles was detected through ICP-MS.

In the preparation of the photocatalyst using the semiconductor particles, in a heat-resistant glass container (400 ml), 100 mg of semiconductor particles powder was dispersed in 100 ml of distilled water. Then, first, a rhodium chloride ($RhCl_3$) aqueous solution was added to a semiconductor particle dispersion solution so that the amount of rhodium (Rh) was 0.1 wt % with respect to the amount of the semiconductor particles, light from a xenon lamp (300 W, 20 mA) was emitted to the semiconductor particle dispersion solution under atmospheric pressure for 10 minutes, and next, a potassium chromate ($K_2CrO_4$) aqueous solution was added to the semiconductor particle dispersion solution so that the amount of chromium (Cr) was 0.05 wt % with respect to the amount of the semiconductor particles, and in the same manner as above, light from a xenon lamp (300 W, mA) was emitted to the semiconductor particle dispersion solution under atmospheric pressure for 5 minutes, and finally, a cobalt nitrate ($Co(NO_3)_2$) aqueous solution was added to the semiconductor particle dispersion solution so that the amount of cobalt (Co) was 0.05 wt % with respect to the amount of the semiconductor particles, and in the same manner as above, light from a xenon lamp (300 W, 20 mA) was emitted to the semiconductor particle dispersion solution under atmospheric pressure for 5 minutes. Here, light from a xenon lamp was emitted while the glass container was covered with a quartz disk. Thus, the semiconductor particle dispersion solution after the treatment was directly used as a solution in which a photocatalyst was dispersed (photocatalyst dispersion solution) for measurement of the quantum efficiency.

In the measurement of the quantum efficiency of the photocatalyst, first, the glass container containing the photocatalyst dispersion solution was degassed with a vacuum pump and then filled with argon gas, and thus air in the glass container was replaced with argon gas. Thereafter, the glass container was connected to a gas chromatograph through a glass pipe, light from a xenon lamp (300 W, 20 mA) was emitted to the photocatalyst dispersion solution in the glass container through a 365 nm bandpass filter, and a water decomposition reaction was caused to generate hydrogen gas. In the detection of the amount of hydrogen gas generated, the hydrogen gas generated in the glass pipe was accumulated when light emission was performed for 2 hours, the accumulated gas was introduced into the gas chromatograph, and the amount of hydrogen gas was detected (measurement was performed every 20 minutes). In the detection of the amount of hydrogen gas in the chromatograph, using a standard gas with a known number of moles of hydrogen gas in advance, a calibration curve between the number of moles of hydrogen and an area of a detection data part corresponding to hydrogen gas was created, and using this calibration curve, the number of moles generated was determined from the area of the detection data part of hydrogen gas introduced from the glass pipe to the gas chromatograph. On the other hand, regarding the number of photons emitted to the photocatalyst dispersion solution in the glass container, the wattage P (energy amount per unit time) of total light emitted to the photocatalyst dispersion solution in the glass container used for measurement was measured with a photodiode sensor, and the number of photons I incident on the photocatalyst dispersion solution per unit time was calculated by the following formula.

$$I(/s)=P(W)\times\lambda(m)/[h(J\cdot s)\times c(m/s)]$$

Here, λ is the wavelength of emitted light, h is the Planck's constant, and c is the speed of light. Thus, the quantum efficiency was calculated by the following formula.

$$\text{quantum efficiency }(\%)=n(/s)\times NA\times 2/I\times 100$$

Here, n is the number of moles of hydrogen gas generated per unit time, and NA is the Avogadro's number.

Figure 2A:
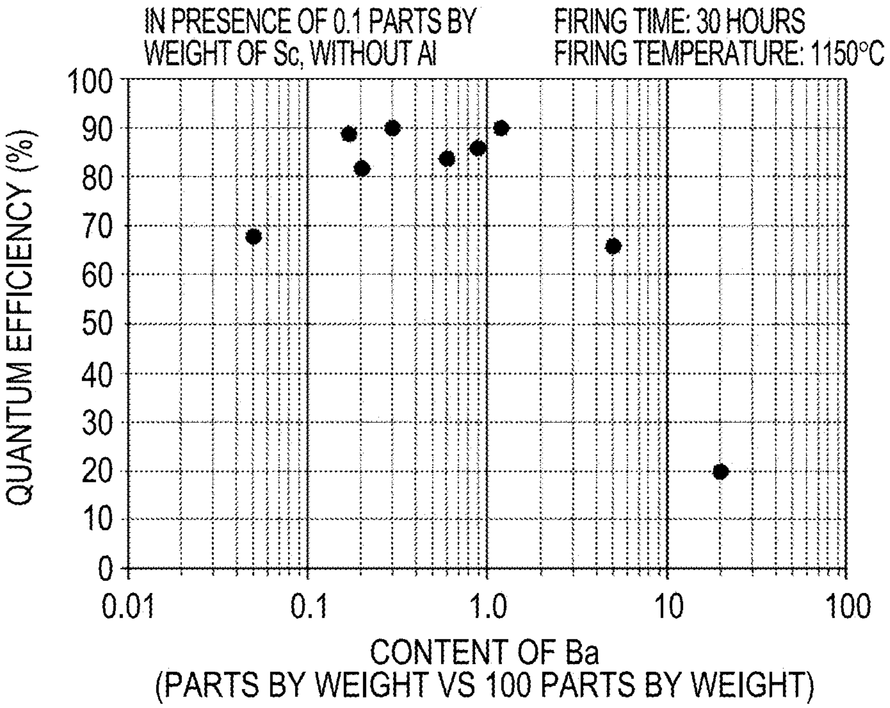
FIG. 2A shows values of the quantum efficiency obtained from the photocatalyst using the semiconductor particles synthesized according to the method of the present disclosure when the content of barium with respect to strontium titanate is changed.

As a result, first, the quantum efficiencies measured with photocatalysts prepared using the semiconductor particles synthesized by variously changing the content of barium are shown in FIG. 2A. Here, in the drawing, the content of barium in the semiconductor particles with respect to 100 parts by weight of strontium titanate is expressed in parts by weight. In addition, in the composition, the content of scandium was 0.1 parts by weight (not including aluminum). The firing time during firing was set to 30 hours, and the firing temperature was set to 1,150° C. As can be understood with reference to the drawing, when the content of barium was 0.04 parts by weight to 5 parts by weight, the quantum efficiency was about 70% or more, and when the content of barium was 0.1 parts by weight to 2 parts by weight, a high quantum efficiency value of 80% to 90% was stably obtained. Therefore, it was shown that, when the content of barium in the semiconductor particles with respect to 100 parts by weight of strontium titanate was 0.04 parts by weight to 5 parts by weight, and more preferably, when the content of barium was 0.1 parts by weight to 2 parts by weight, a photocatalyst that provides high quantum efficiency could be obtained.

Figure 2B:
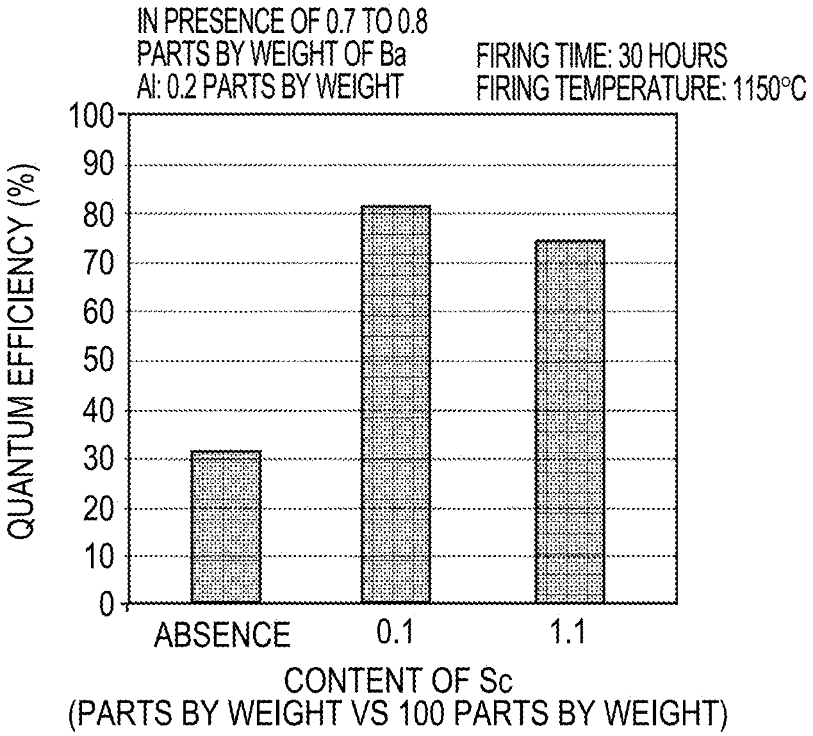
FIG. 2B shows values of the quantum efficiency obtained from the photocatalyst using the semiconductor particles synthesized according to the method of the present disclosure when the content of scandium with respect to strontium titanate is changed in the presence of barium and aluminum.

The quantum efficiencies measured with the photocatalysts prepared using semiconductor particles synthesized by changing the content of scandium in the presence of barium and aluminum are shown in FIG. 2B. Here, with respect to 100 parts by weight of strontium titanate, the content of barium was 0.7 parts by weight to 0.8 parts by weight, and the content of aluminum was 0.2 parts by weight. The firing time during firing was 30 hours, and the firing temperature was 1,150° C. Based on the results in the drawing, it was shown that, even without scandium, a quantum efficiency of about 30% could be obtained, but when the content of scandium was 0.1 parts by weight to 1 part by weight, a photocatalyst with a high quantum efficiency of more than 70% or 80% could be obtained. In addition, with reference to the results in FIG. 2A together, it can be understood that, in the semiconductor particles, when barium of about 0.1 parts by weight to 2 parts by weight was present, the presence of aluminum on the order of 0.1 parts by weight did not make a significant difference in the quantum efficiency of the photocatalyst.

Furthermore, the quantum efficiency of the photocatalyst using the semiconductor particles (with respect to 100 parts by weight of strontium titanate, the content of barium was 0.75 parts by weight, the content of scandium was 0.58 parts by weight, and the content of aluminum was 0.18 parts by weight) synthesized by the first synthesis method was 82%, and the quantum efficiency of the photocatalyst using the semiconductor particles (with respect to 100 parts by weight of strontium titanate, the content of barium was 0.75 parts by weight, the content of scandium was 0.62 parts by weight, and the content of aluminum was 0.14 parts by weight) synthesized by the second synthesis method was 84%. Therefore, it can be understood that there was no significant difference between the photocatalyst using the semiconductor particles synthesized by the first synthesis method and the photocatalyst using the semiconductor particles synthesized by the second synthesis method.

Figure 3A:
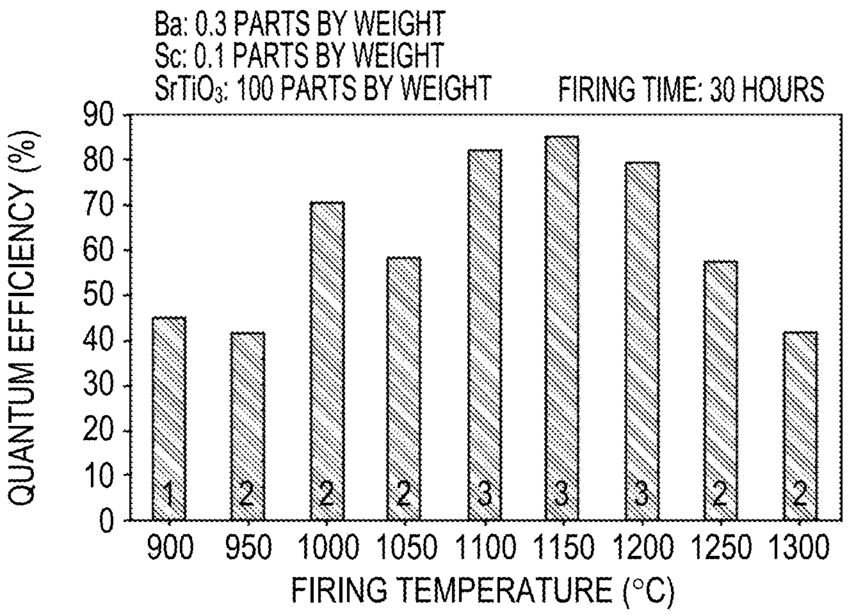
FIG. 3A shows values of the quantum efficiency obtained from the photocatalyst using the semiconductor particles synthesized according to the method of the present disclosure when the temperature during firing in synthesis of semiconductor particles is changed.
Figure 3B:
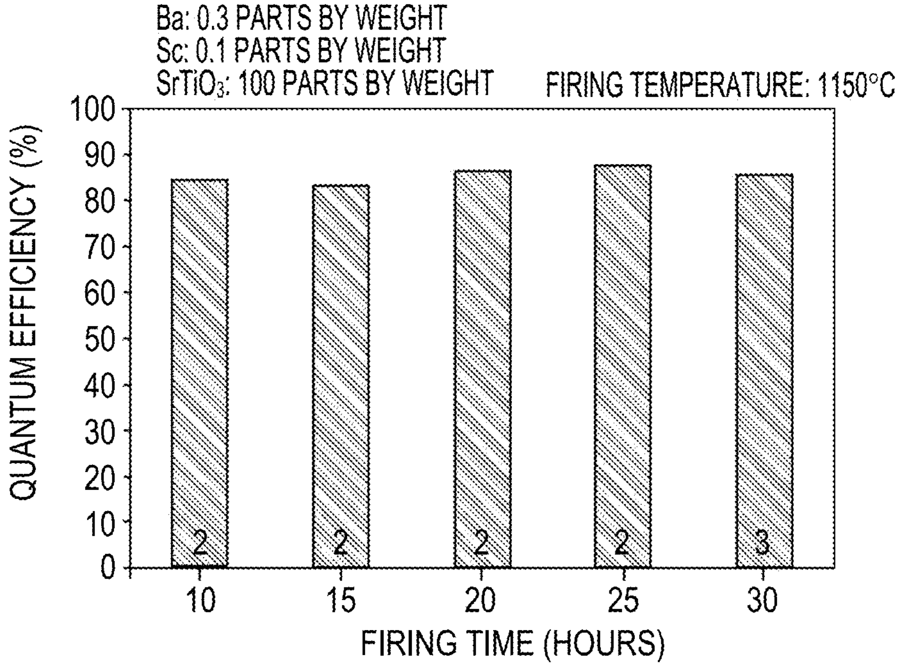
FIG. 3B shows values of the quantum efficiency obtained from the photocatalyst using the semiconductor particles synthesized according to the method of the present disclosure when the time during firing in synthesis of semiconductor particles is changed. Numbers in the bar graph indicate the number of experiments under the conditions.

Next, the quantum efficiencies measured with photocatalysts prepared using the semiconductor particles synthesized by variously changing the firing temperature and the firing time during firing of the powder mixture are shown in FIG. 3A and FIG. 3B. Here, the semiconductor particles were prepared so that the composition contained 0.3 parts by weight of barium and 0.1 parts by weight of scandium with respect to 100 parts by weight of strontium titanate. First, with reference to FIG. 3A, if the firing time was constant (30 hours), when the firing temperature was 1,000° C. to 1,200° C., the quantum efficiency exceeded about 70%, and when the firing temperature was 1,100° C. to 1,200° C., the quantum efficiency exceeded about 80%, and when the firing temperature was 1,150° C., the quantum efficiency was maximized. On the other hand, with reference to FIG. 3B, when the firing temperature was constant (1,150° C.), the quantum efficiency exceeded 80% within a firing time range of 10 hours to 30 hours, and no significant difference was observed within this time range. Therefore, it was shown that, when the firing time was in a range of 10 hours to 30 hours and the firing temperature was 1,000° C. to 1,200° C., and more preferably 1,100° C. to 1,200° C., it was possible to synthesize semiconductor particles that stably provide high quantum efficiency.

It can be clearly understood that the above description is related to the embodiments of the present disclosure, and those skilled in the art can easily make many modifications and changes, and the present disclosure is not limited to the above exemplified embodiments, but can be applied to various devices without departing from the concept of the present disclosure.

What is claimed is:

1. Semiconductor particles containing strontium titanate used as a photocatalyst that causes a water decomposition reaction in which water molecules are decomposed into oxygen molecules and hydrogen molecules according to light emission, and in which strontium titanate is doped with barium, wherein the strontium titanate is additionally doped with scandium.

2. The semiconductor particles according to claim 1,
wherein the content of barium is 0.04 parts by weight to 5 parts by weight, and the content of scandium is 0.1 parts by weight to 1 part by weight with respect to 100 parts by weight of strontium titanate.

3. The semiconductor particles according to claim 2,
wherein the content of barium is 0.1 parts by weight to 2 parts by weight.

4. The semiconductor particles according to claim 1, which are substantially free of aluminum.

5. The semiconductor particles according to claim 4,
wherein the content of aluminum with respect to 100 parts by weight of strontium titanate is 1 part by weight or less.

6. A photocatalyst obtained by adding a co-catalyst to the semiconductor particles according to claim 5,
wherein the co-catalyst is rhodium-chromium oxide ($Rh/Cr_2O_3$) or cobalt hydroxide oxide (CoOOH).

7. A photocatalyst obtained by adding a co-catalyst to the semiconductor particles according to claim 4,
wherein the co-catalyst is rhodium-chromium oxide ($Rh/Cr_2O_3$) or cobalt hydroxide oxide (CoOOH).

8. A photocatalyst obtained by adding a co-catalyst to the semiconductor particles according to claim 1, wherein the co-catalyst is rhodium-chromium oxide ($Rh/Cr_2O_3$) or cobalt hydroxide oxide (CoOOH).

9. The photocatalyst according to claim 8, wherein the co-catalyst is added to the surface of the semiconductor particles dispersed in water by photoelectrodepositing.

10. A method of synthesizing semiconductor particles used in a photocatalyst which is obtained by adding a co-catalyst to semiconductor particles containing strontium titanate and which causes a water decomposition reaction in which water molecules are decomposed into oxygen molecules and hydrogen molecules according to light emission, the method comprising a process of synthesizing the semiconductor particles containing strontium titanate doped with barium by mixing barium titanate ($BaTiO_3$) into strontium chloride ($SrCl_2$) and performing firing.

11. The method according to claim 10, wherein, in the process of synthesizing the semiconductor particles, the semiconductor particles are doped with barium and scandium by additionally mixing scandium oxide ($Sc_2O_3$) into the strontium chloride and performing firing.

12. The method according to claim 11, wherein, in the process of synthesizing the semiconductor particles, 500 parts by mole to 2,000 parts by mole of strontium chloride and 0.1 parts by mole to 5 parts by mole of scandium oxide with respect to 100 parts by mole of barium titanate are mixed in and fired to synthesize the semiconductor particles.

13. The method according to claim 10, wherein, in the process of synthesizing semiconductor particles, a firing temperature is 1,000° C. to 1,200° C., and a firing time is 10 hours to 30 hours.

14. A method of synthesizing a photocatalyst that causes a water decomposition reaction in which water molecules are decomposed into oxygen molecules and hydrogen molecules according to light emission using the semiconductor particles synthesized by the method according to claim 10, the method comprising a process of adding the co-catalyst to the surface of the semiconductor particles dispersed in water.

15. The method according to claim 14, wherein the co-catalyst is rhodium-chromium oxide ($Rh/Cr_2O_3$) or cobalt hydroxide oxide (CoOOH).

16. The method according to claim 15, wherein, in the process of adding the co-catalyst, the co-catalyst is added to the surface of the semiconductor particles dispersed in water by photoelectrodepositing.

17. A method of synthesizing semiconductor particles used in a photocatalyst which is obtained by adding a co-catalyst to semiconductor particles containing strontium titanate and which causes a water decomposition reaction in which water molecules are decomposed into oxygen molecules and hydrogen molecules according to light emission, the method comprising a process of synthesizing the semiconductor particles containing strontium titanate doped with barium and scandium by mixing strontium titanate ($SrTiO_3$) and scandium oxide ($Sc_2O_3$) into a mixture containing strontium chloride ($SrCl_2$) and barium chloride ($BaCl_2$) and performing firing.

18. The method according to claim 17, wherein, in the process of synthesizing the semiconductor particles, the semiconductor particles are additionally doped with aluminum by additionally mixing aluminum oxide ($Al_2O_3$) into the mixture containing strontium chloride and barium chloride and performing firing.

19. The method according to claim 17, wherein, in the process of synthesizing the semiconductor particles, the semiconductor particles are synthesized by mixing a mixture containing strontium chloride and barium chloride at a molar ratio of 1:9 to 9:1 as a mixture of 1,000 parts by mole of strontium chloride and barium chloride with respect to 100 parts by mole of strontium titanate, 0.1 parts by mole to 5 parts by mole of scandium oxide ($Sc_2O_3$) and 0 parts by mole to 5 parts by mole of aluminum oxide and performing firing.

* * * * *